(12) United States Patent  (10) Patent No.: US 7,646,497 B2
Shima  (45) Date of Patent: Jan. 12, 2010

(54) PRINTER DRIVER PRODUCT, PRINT CONTROL UNIT, PRINT SYSTEM, AND PRINT CONTROL METHOD

(75) Inventor: Shuichi Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 867 days.

(21) Appl. No.: 11/084,038

(22) Filed: Mar. 21, 2005

(65) Prior Publication Data

US 2005/0206941 A1   Sep. 22, 2005

(30) Foreign Application Priority Data

Mar. 19, 2004   (JP) .............................. 2004-079486
Feb. 1, 2005    (JP) .............................. 2005-025042

(51) Int. Cl.
      *G06F 3/12*   (2006.01)
(52) U.S. Cl. ....................... 358/1.13; 358/1.1; 358/1.15
(58) Field of Classification Search ....... 358/1.11–1.18; 715/234; 713/162
      See application file for complete search history.

(56) References Cited

U.S. PATENT DOCUMENTS

| | | | |
|---|---|---|---|
| 5,390,354 A | * | 2/1995 | de Heus et al. ............. 715/234 |
| 6,476,931 B1 | * | 11/2002 | Aizikowitz et al. ........ 358/1.18 |
| 6,848,048 B1 | * | 1/2005 | Holmes ....................... 713/162 |
| 7,084,998 B2 | * | 8/2006 | Blair et al. ................. 358/1.15 |
| 7,180,623 B2 | * | 2/2007 | Kato, Kazunori .......... 358/1.15 |
| 7,256,901 B2 | * | 8/2007 | Ferlitsch .................... 358/1.13 |
| 7,382,473 B2 | * | 6/2008 | Chohsa et al. ............. 358/1.13 |
| 2002/0067498 A1 | * | 6/2002 | Chapman ................... 358/1.13 |
| 2003/0231328 A1 | * | 12/2003 | Chapin et al. ............. 358/1.13 |

* cited by examiner

*Primary Examiner*—King Y Poon
*Assistant Examiner*—Lennin R Rodriguez
(74) *Attorney, Agent, or Firm*—Sughrue Mion, PLLC (57) ABSTRACT

A product of printer driver which operates on an operating system making a computer execute a conversion processing to convert data in electronic document format into data in bitmap format, the printer driver flirt her making the computer execute, an accepting process which accepts from the operating system print target data in electronic document format, a first outputting process which generates, based on the print target data in electronic document format, print data in a command language format capable for interpretation by a printer as a control target and outputs the print data thus generated to the printer, and a second outputting process which requests the operating system to convert the print target data in electronic document format into bitmap data, and outputs print data based on the bitmap data thus converted to the printer, and the first outputting process and the second outputting process are selectively performed.

10 Claims, 7 Drawing Sheets

PRINTER DRIVER PRODUCT, PRINT CONTROL UNIT, PRINT SYSTEM, AND PRINT CONTROL METHOD

BACKGROUND OF THE INVENTION

The present invention relates to data conversion in print processing, and more particularly, it relates to data conversion into print data in a format of general-purpose electronic document.

An operating system (OS) employed in a computer decides what kind of display format is used, when a document handled on the computer is displayed, printed, or the like.

For example, MacOSX (trademark), which is developed as OS for Macintosh (trademark) of Apple Computer, Inc., employs as a standard display format, PDF (Portable Document Format) (trademark), which is a general-purpose electronic document having been developed by Adobe systems, Inc.

Figure 7:
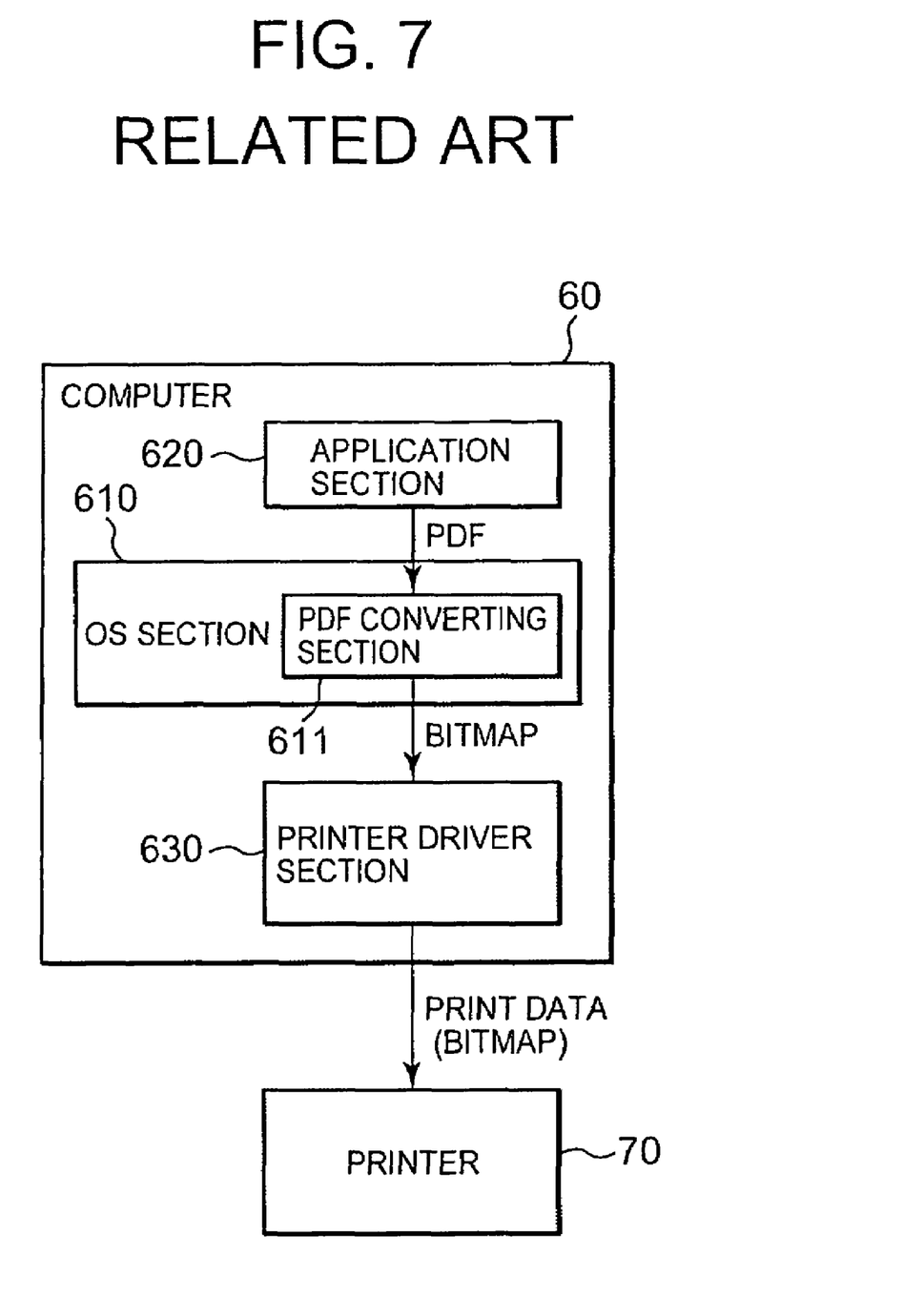
FIG. 7 is a block diagram to explain a functional configuration of a conventional print system.

Generally, a printer is not capable to interpret by itself a document described in PDF. Therefore, when the document described in PDF is printed, a processing as shown in FIG. 7 is carried out. Here, there will be explained an example in which a document generated by application section 620 in computer 60 is printed by printer 70.

That is, PDF converting section 611 provided in the OS section 610 converts the document described in PDF into the bitmap format. Printer driver section 630 converts the data in the bitmap format into print data which the printer 70 is capable to interpret, and outputs thus converted data to the printer 70.

Then, the printer 70 performs printing based on a print image, and a print result as exactly shown on the display of the computer 60 can be obtained.

SUMMARY OF THE INVENTION

As described above, since the PDF converting section 611, which is provided in the OS section 610, carries out the PDF converting process, the data in the bitmap format is delivered to the printer driver section 630.

Accordingly, the printer driver section 630 transmits print data indicating bitmap image to the printer 70. In general, when the print data is represented as bitmap, data size tends to be large, compared to the case where it is represented by a page description language, intermediate language, or the like. Therefore, such a system as described above may provide a relatively large load on communication processing.

Furthermore, since the OS section 610 carries out conversion of the data into the bitmap format, printing speed largely depends on the processing speed of the computer 60. Therefore, even if the printer 70 is equipped with a high speed print processing engine, such capability may not be fully utilized.

Further, some of the printer driver sections 630 perform an image processing appropriate for an object included in the document data, so as to obtain a print result of higher quality on the printer 70. Such examples include, optimum color correction is performed on graphics, enhancement on the color of black is performed on a text, and the like.

With such printer driver sections 630 as described above, the document has to be analyzed so as to recognize objects included in the document, before the image processing corresponds to object is performed.

However, in the system as describe above, the object cannot be recognized since the printer driver section 630 receives data, which has been converted into the bitmap format by the OS section 610. Therefore, the printer driver section 630 is forced to carry out the image processing uniformly for one entire page, not by object.

The first object of the present invention is to reduce a communication load, when printing is performed on the basis of print target data in electronic document format.

The second object of the present invention is to make full use of capabilities of the printer, when printing is performed on the basis of the print target data in electronic document format.

The third object of the present invention is to allow the printer driver to execute an image processing with respect to each of the objects which constitute the print target data, when printing is performed on the basis of the print target data in electronic document format.

A first aspect of the present invention in order to achieve any one of the above objects is directed to a product of printer driver which makes a computer execute a processing to control a printer, wherein, the printer driver makes the computer execute, an accepting process which accepts print target data in electronic document format, a generating process which generates print data in a command language format which is capable of being interpreted by the printer, on the basis of the print target data in electronic document format, and an outputting process which outputs to the printer, the print data in the command language format thus generated.

Since the print data in the command language format is generally smaller in data size than the print data in the bitmap format, it is possible to reduce the communication load.

Since interpreting the print data in the command language format is carried out on the printer side, it is possible to make full use of the capability of the printer.

A second aspect of the present invention in order to achieve any one of the above objects is directed to a product of printer driver, which operates on an operating system which makes a computer execute a conversion processing to convert the data in electronic document format into data in the bitmap format, wherein the printer driver makes the computer execute, an accepting process which accepts from the operating system the print target data in electronic document format, a first outputting process which generates, based on the print target data in electronic document format, print data in a command language format capable for interpretation by a printer as a control target and outputs the print data thus generated to the printer, and a second outputting process which requests the operating system to convert the print target data in electronic document format into the bitmap data, and outputs to the printer the print data based on the bitmap data thus converted, and the first outputting process and the second outputting process are selectively performed.

According to the second aspect of the invention, the print data in the command language format is outputted, whereby the communication load is reduced and it is possible to make full use of the capability of the printer. Alternatively, by requesting the bitmap data conversion to the operating system, a print result which reveals exactly what is shown on a display device and the like is assured.

Here, the printer is capable to interpret multiple command language formats, and the first outputting process is capable of selectively generating print data in any one of the command language formats. Concretely, the command language formats may include a first command language format which can be directly interpreted and a second command language format which is firstly converted into the first command language format for interpretation.

An intermediate language is a representative example of the first command language format, while a page description language is a representative example of the second command language format.

Furthermore, it is desirable that a selection of the first outputting process and the second outputting process, and a selection of a command language format when the first outputting process is selected are performed according to an instruction from a user.

Accordingly, it is possible to obtain a print result as desired by the user.

If the electronic document format is to represent the print target data in units of object, the image processing is carried out in the first outputting process with respect to each of the objects constituting the print target data of the electronic document format, whereby the image processing in units of object can be performed in the printer driver, the objects constituting the print target data in electronic document format.

Typically, the electronic document format may be PDF (Portable Document Format) (trademark).

Furthermore, by making the computer execute, a processing to accept from the operating system, the print target data in the page description language which the printer is incapable to interpret, and a processing to convert the print target data into the data in electronic document format, when the printer accepts the print target data in the page description language, thereby handling of page description language may also be attained easily.

Typically, the page description language may be PostScript.

Moreover, according to the third aspect of the present invention, a printer control unit is provided. According to the fourth aspect of the present invention, a print system is provided. Finally according to the fifth aspect of the present invention, a print control method is provided.

In any of the aspects of the present invention, load on the communication is reduced, and the capability of the printer is fully utilized by outputting print data in a command language format.

DETAILED DESCRIPTION OF THE PREFERRED EMBODIMENTS

Preferred embodiments of the present invention will be explained with reference to the accompanying drawings.

Figure 1:
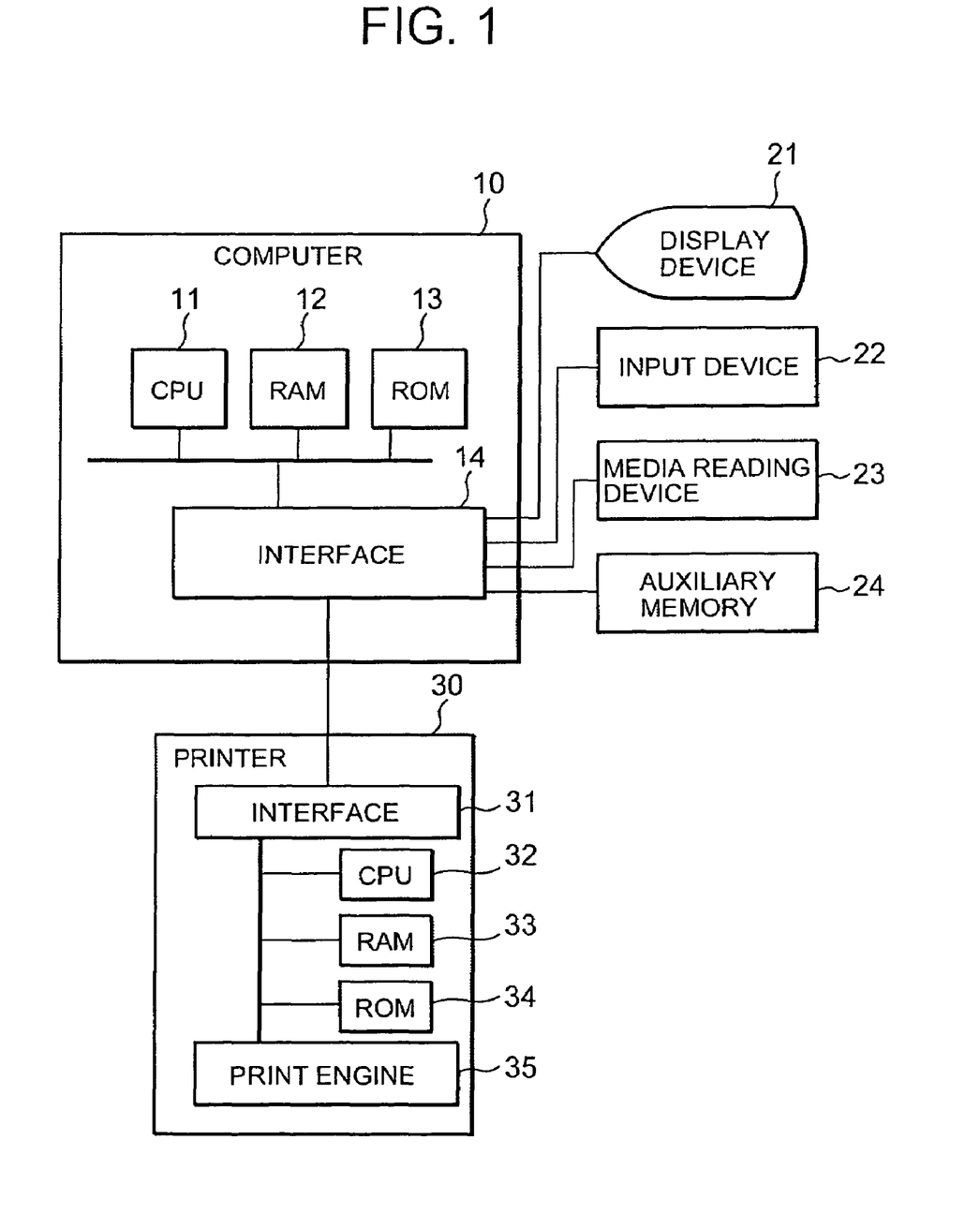
FIG. 1 is a block diagram to explain a hardware configuration of a print system.

FIG. 1 is a block diagram to explain an overview of hardware configuration of the print system, to which the present invention is applicable.

As shown in FIG. 1, the print system is provided with a computer 10, which implements various processing by application software, print processing by a printer driver, and the like, and a printer 30 which is connected to the computer 10. In the present embodiment, the computer 10 functions as a print control unit to control the printer 30. The printer 30 functions as a printer to perform printing on the basis of the data transmitted from the computer 10. It is to be noted that the configuration of the print system is not limited to the example above. For instance, the print system may be a network type system, or a print system in which the printer 30 is provided with a function of print control unit of the computer 10.

The computer 10 is provided with a CPU (Central Processing Unit) 11 to execute various programs, RAM (Random Access Memory) 12 to temporarily store data, program, and the like, ROM (Read Only Memory) 13 to store various data and various programs and the like in advance in nonvolatile manner to control the computer 10, and interface 14 which controls data transmission/reception with peripheral equipment such as the printer 30 being connected.

In addition, the computer 10 is connected to a display device 21 such as a color display, an input device 22 such as a mouse and a keyboard, a media reading device 23 to read data from a recording medium such as CD-ROM, and a built-in or external auxiliary memory 24. The computer 10 is not limited to the configuration above. For example, a communication controller to establish connection with the computer network such as the Internet may also be provided.

The printer 30 is a laser-beam page printer, for example. The laser-beam page printer is provided with a cartridge containing toner, and printing is performed by transferring the toner onto a print medium such as print sheet. It is to be noted that a printing method of the printer 30 is not limited to the example above. As long as the printer 30 is provided with a language interpreting function as described below, the printer 30 may be an ink-jet color printer, or a printer employing another type of printing method.

The printer 30 may be provided with an interface 31 which controls data transmission/reception with the computer 10, a CPU 32 which executes various programs, RAM 33 which temporarily stores the print data and the like, ROM 34 which stores in advance various data, various programs and the like in nonvolatile manner to control the printer 30, a print engine 35 including a toner cartridge, a photoconductor drum, laser beam irradiating mechanism, a paper feed/eject mechanism and the like to carry out a process for feeding and ejecting print medium, and the like. As a matter of course, the configuration of the printer 30 is not limited to the example above.

Next, with reference to the block diagram in FIG. 2, a functional configuration implemented by the computer 10 and the printer 30 according to the print system as described above will be explained.

Figure 2:
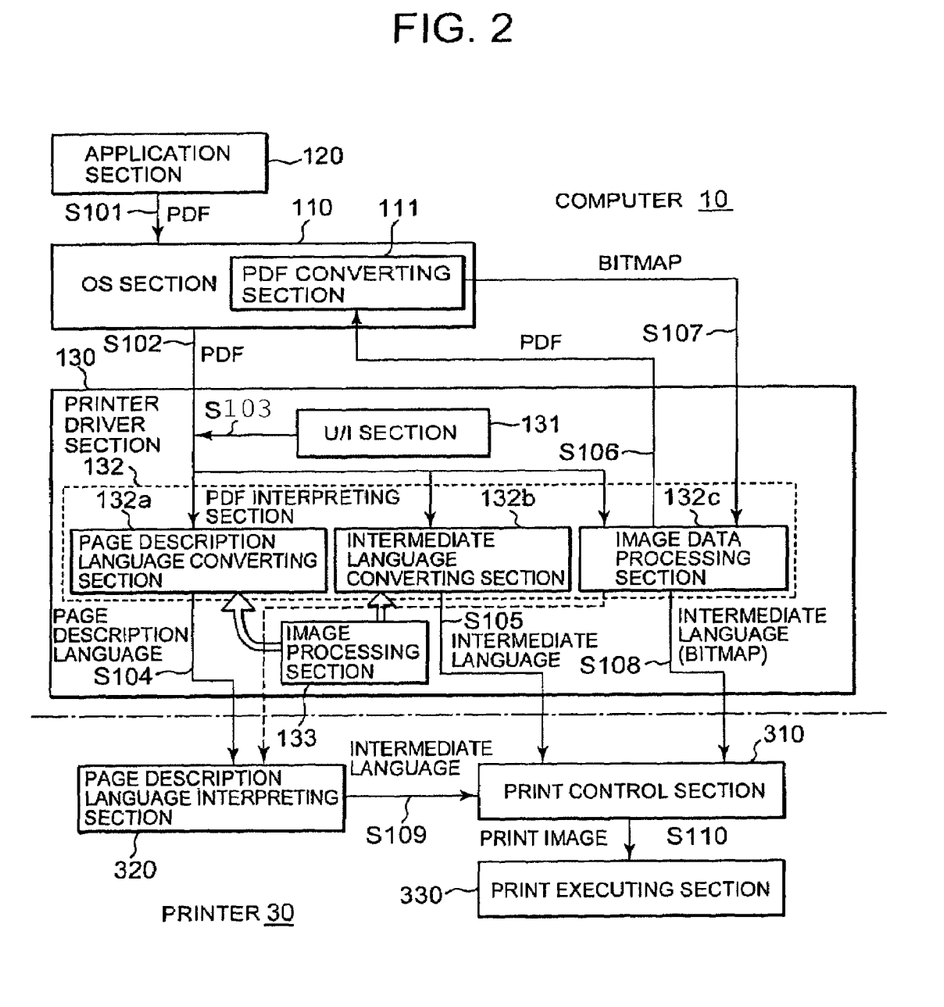
FIG. 2 is a block diagram to explain a functional configuration of the print system.

As shown in FIG. 2, operating system (OS) section 110, application section 120, and printer driver section 130 are constructed on the computer 10.

The OS section 110 is referred as basic software for the computer 10 provides a system control of the computer 10 and a basic user operational environment. In the present embodiment, the OS section 110 employs as a standard display format, PDF (Portable Document Format) (trademark) which is a general-purpose electronic document format developed by Adobe Systems, Inc., at the time of displaying/printing the displayed document on a computer.

Typically, the OS section 110 as described above may be MacOSX (trademark), which has been developed as an operating system for Macintosh (trademark) of Apple Computer, Inc., for example.

The OS section 110 is provided with PDF converting section 111 which converts PDF into bitmap format data, so that a document described in PDF is printed as exactly shown on the display device 21.

The application section 120 has a function to allow the computer 10 to perform processing for creating and/or editing a document. The application section 120 is constructed virtually on the computer 10, when the CPU 11 executes, under a control of the OS section 110, a word processor program or graphics processing program and the like read by RAM 12.

The document created and/or edited by the application section 120 employs specifications to comply with PDF as a display format, and when the document is printed, it is transferred to the OS section 110 as PDF data.

The printer driver section 130 performs a control processing for the printer 30 to execute printing. Concretely, when the printer driver section 130 accepts a printing instruction from a user, the printer driver section 130 reads the document data created by the application section 120 via the OS section 110, and converts the data into a format that the printer 30 is capable to interpret according to print settings. Then, the data thus converted is transmitted to the printer 30 via the interface 14.

In the present embodiment, as a featured functional configuration, the printer driver section 130 is provided with user interface (U/I) section 131, PDF interpreting section 132, and image processing section 133.

The user interface section 131 performs a processing to display a status and the like of the printer 30, and to accept printing instruction, print settings and the like from a user. Particularly, in the present embodiment, the user interface section 131 accepts from the user, an instruction on how to interpret the PDF.

The PDF interpreting section 132 performs processing to interpret the PDF, and convert it into print data in a command language format which the printer 30 is capable to interpret. Concretely, since the PDF data is compressed, it is initially decompressed by a predetermined algorithm. At this stage, the PDF data turns into a group of commands indicating objects such as image data and a text. In addition, the PDF interpreting section 132 performs processing to replace the commands constituting the PDF data with commands which the printer is capable to interpret. It is to be noted here, since the commands constituting the PDF data and the commands which the printer 30 is capable to interpret are generally not in one-to-one correspondence, the PDF interpreting section 132 employs a replacement algorithm so that a display style in PDF can be recreated as faithfully as possible.

In the present embodiment, for the conversion into the command language format which the printer 30 is capable to interpret, a page description language format or an intermediate language format can be selected. Here, the page description language is a high level programming language which represents characters, graphics and the like constituting a page in units of object. The intermediate language is a language structure wherein the page description language is further converted into a format much easier for the printer 30 to interpret.

As described below, the printer 30 is capable of directly interpreting the intermediate language to execute printing. Furthermore, the printer 30 is provided with a function to interpret the page description language, and when data is transmitted in the page description language, conversion into the intermediate language is performed in the printer 30 before execution of the printing.

For this purpose, the PDF interpreting section 132 is provided with a page description language converting section 132a which converts PDF into a page description language, and an intermediate language converting section 132b which converts PDF into an intermediate language.

Figure 5A:
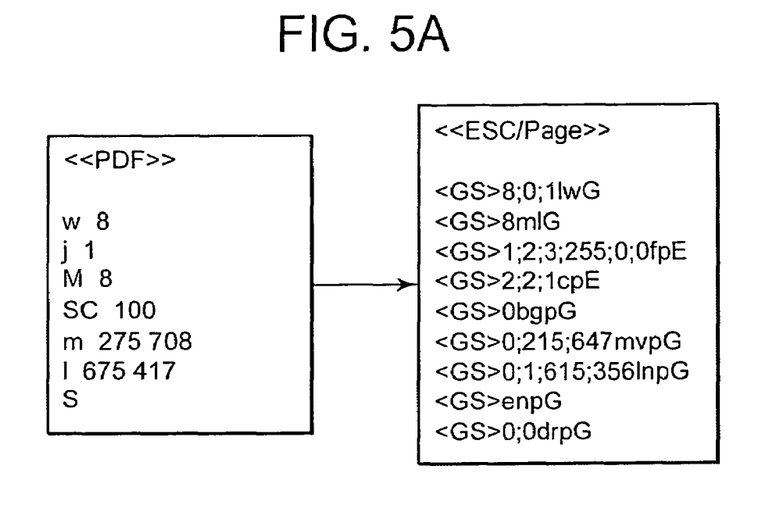
FIG. 5A shows illustrations of conversion example from PDF to a page description language where conversion example is a group of commands to draw a red line.
Figure 5B:
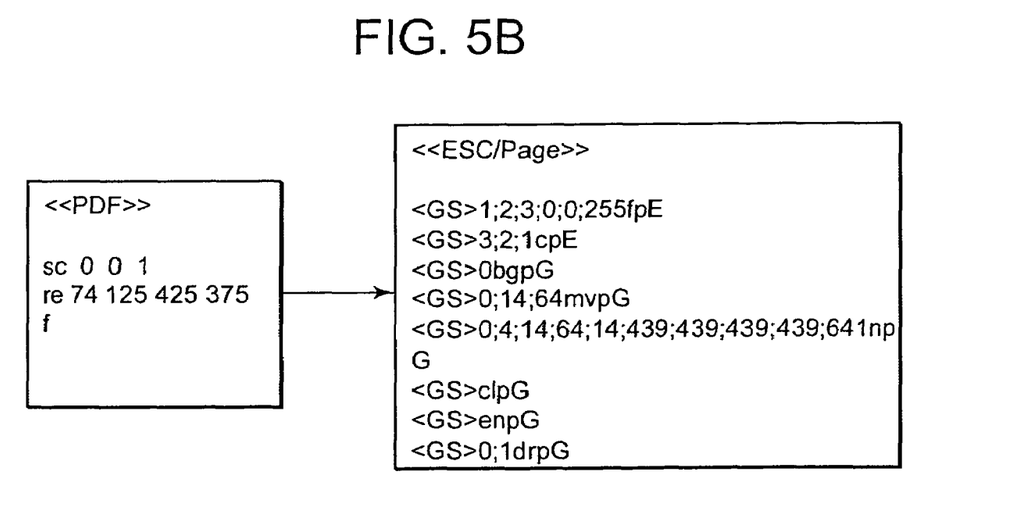
FIG. 5B shows illustrations of conversion example from PDF to a page description language where conversion example is a group of commands to fill in a rectangular area with blue color.

FIG. 5 shows illustrations of conversion example from PDF to a page description language, which is executed by the page description language converting section 132a. The illustrations employ as an example, ESC/Page, which is a page description language for a page printer manufactured by Seiko Epson Corporation. FIG. 5A shows a conversion example of a group of commands to draw a red line. FIG. 5B shows a conversion example of group of commands to fill in a rectangular area with blue color.

Now returning to FIG. 2, the PDF interpreting section 132 is provided with an image data processing section 132c in order to execute print processing even after PDF conversion is performed by a conventional OS section 110. This is based on the following reasons.

That is, PDF conversion algorithm used by the PDF interpreting section 132 does not necessarily agree with the conversion algorithm used by the PDF converting section 111 provided by the OS section 110. Therefore, in some types of printing, a result of printing with an interpretation by the PDF interpreting section 132 may be different from the result displayed on the display device 21. This arrangement is adopted in order to obtain a print result which reveals exactly what is shown on a display device.

When printing is executed, the image processing section 133 performs an image processing suitable for the characteristics and the like of the printer 30, so as to execute printing with a higher quality. The image processing can be carried out in units of objects which constitute the document as a print target. For example, it is possible to conduct an optimum color correction for a graphics portion, and as for a text portion, black color is enhanced to make the text more legible.

In addition, the image processing in the image processing section 133 may be carried out on the basis of an instruction from a user regarding image effect. For example, it may include an instruction to print the image more sharply or softly, an instruction to emphasize a specific color, or the like.

The printer driver section 130 is constructed virtually on the computer 10, when the CPU 11 executes a printer driver program that has been loaded in the RAM 12. The printer driver program for this purpose is developed by a manufacturer and the like of the printer 30, and the program could be distributed by recording the program on a portable recording medium such as CD-ROM, for example. Then, the media reading device 23 reads the program on the recording medium, whereby the printer driver program can be installed on the computer 10. In addition, it is also possible to install the program on the computer 10 via a computer network such as the Internet.

As shown in FIG. 2, the print control section 310, page description language interpreting section 320, and print executing section 330 are constructed on the printer 30.

The print control section 310 carries out a control of print processing in the printer 30. Concretely, the print control section 310 generates print image of bitmap data on the basis of an intermediate language, and makes the print executing section 330 execute printing.

The page description language interpreting section 320 interprets the page description language and converts it into the intermediate language. The page description language which can be interpreted by the page description language interpreting section 320 is determined in advance. In the present print system, for example, a page description language complying with a specification defined by a manufacturer of the printer 30 may be employed. Alternatively, a general purpose page description language may be employed.

The print executing section 330 executes printing by the print engine 35, on the basis of the print image which has been generated by the print control section 310.

Next, with reference to FIG. 2, print processing according to the present embodiment will be explained.

When the user interface section 131 in the printer driver section 130 accepts a print command from a user, with respect to a document currently processed in the application section 120, initiates print processing.

At the time of entering the print command, the user is allowed to instruct how the PDF interpretation is performed. The user interface section 131 accepts this instruction from the user, for example, on the PDF conversion process setting screen 500 as shown in FIG. 3.

Figure 3:
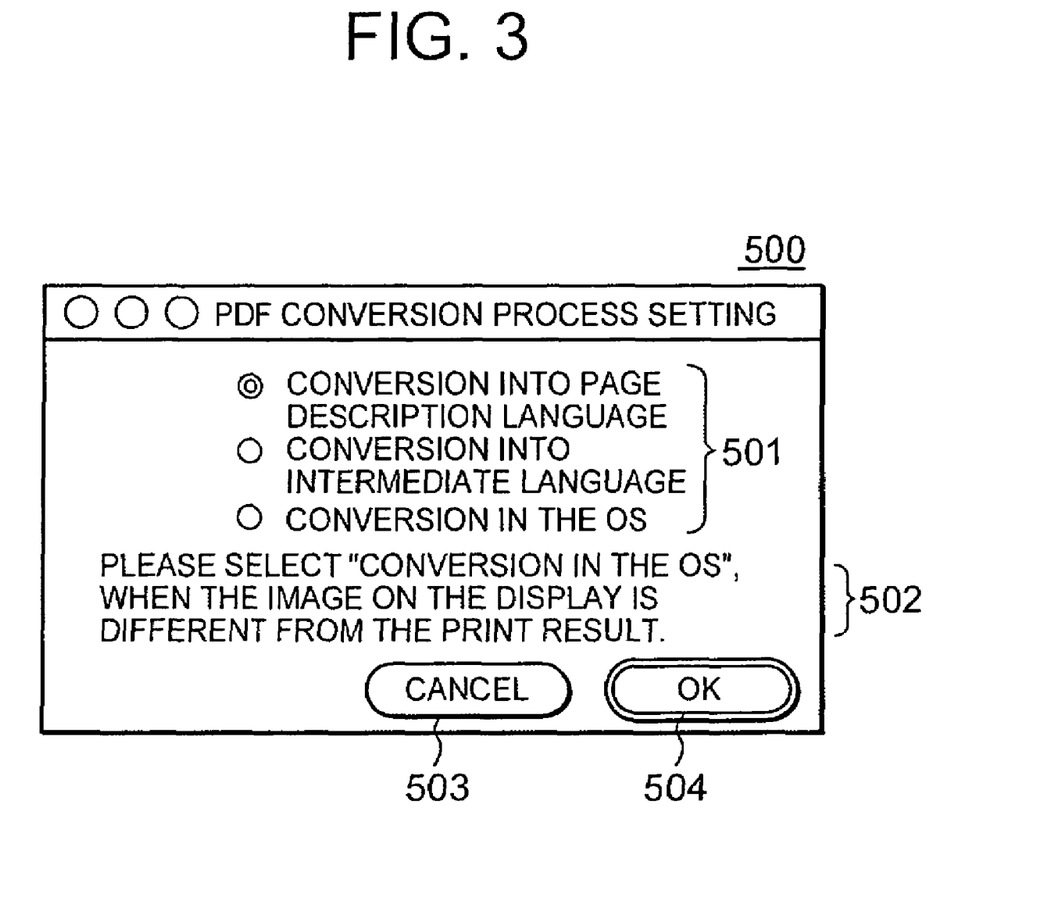
FIG. 3 is an illustration to show an example of a PDF conversion process setting screen.

In FIG. 3, on the PDF conversion process setting screen 500, there are arranged a field for accepting PDF conversion process selection 501 which accepts a selection of the PDF conversion process, a comment display field 502 to display a comment to be informed to the user, a cancel button 503, and an OK button 504. It is to be noted that selection of the PDF conversion process is not necessarily required by all of the users. Therefore, it is possible to arrange the PDF conversion process setting screen 500 as an optional setting, so that it is displayed only when an instruction for setting options from the user is accepted.

Figure 6:
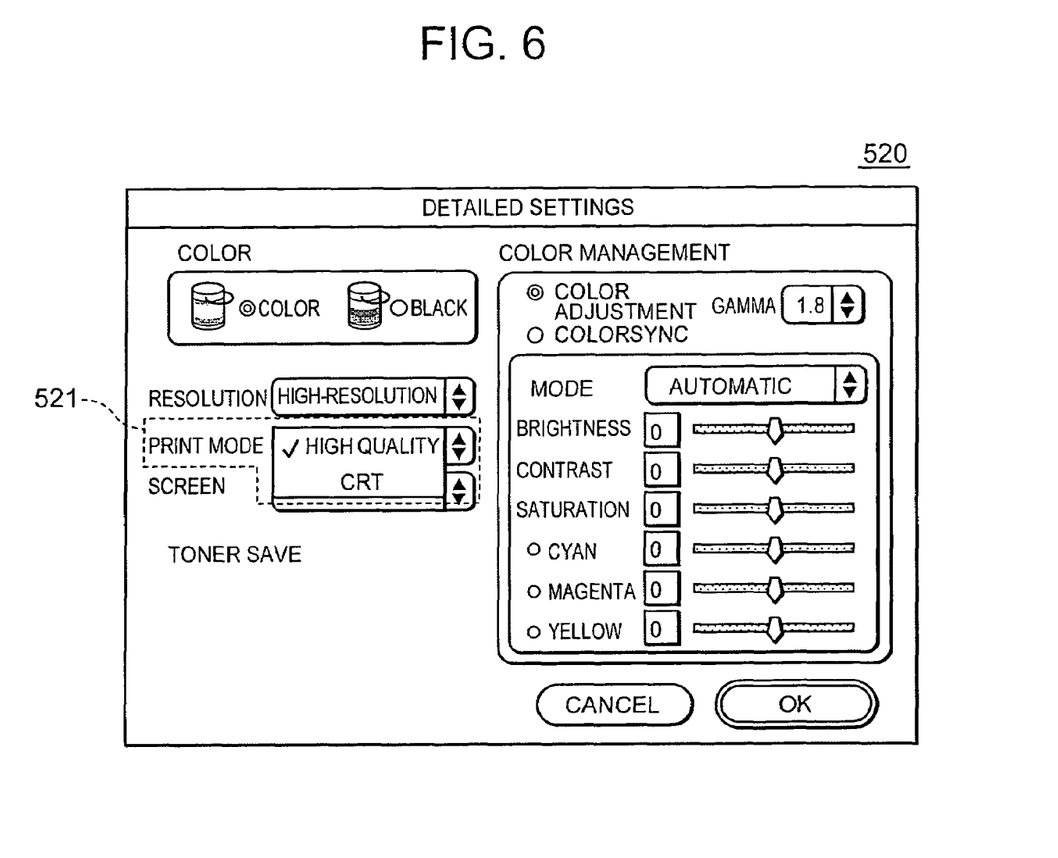
FIG. 6 is an illustration to show an example of detailed setting screen.

For example, FIG. 6 is an illustration to show a detailed setting screen 520 for accepting detailed print settings as options. The detailed setting screen 520 is a screen which can be displayed when there is a requirement from a user as to the detailed print settings, such as color adjustment.

In the present example, by setting the print mode 521, selection of the PDF conversion process is indirectly accepted. That is, as options of the print mode, "High quality" and "CRT" are prepared, and when the user selects "High quality", print processing is conducted assuming that "conversion into page description language" is selected. On the other hand, when the user selects "CRT", print processing is conducted assuming that "conversion in the OS" is selected.

Here, the term "CRT (Cathode Ray Tube)" is used as an option corresponding to "conversion in the OS" since it is the mode for obtaining the print result exactly as displayed on the display device 21 typically used for the computer 10 is ensured.

On the other hand, the term "High quality" is used as an option corresponding to the "conversion into page description language", because it is the mode where an optimum image processing suitable for each object included in a page is available, and thus high quality printing can be expected.

Now, returning to FIG. 3, in the field for accepting PDF conversion process selection 501, "CONVERSION INTO PAGE DESCRIPTION LANGUAGE", "CONVERSION INTO INTERMEDIATE LANGUAGE", and "CONVERSION IN THE OS" are shown as options, and any one of them can be selected. Here, for instance, when the option of "CONVERSION INTO PAGE DESCRIPTION LANGUAGE" is set as a default value, and if there is no instruction from the user, it is possible to assume that the option "CONVERSION INTO PAGE DESCRIPTION LANGUAGE" is selected. Furthermore, the options displayed in the field for accepting PDF conversion process selection 501 may include "CONVERSION IN THE OS", and either one of the "CONVERSION INTO PAGE DESCRIPTION LANGUAGE" and "CONVERSION INTO INTERMEDIATE LANGUAGE".

In the present example, the comment display field 502 displays a comment "PLEASE SELECT "CONVERSION IN THE OS", WHEN THE IMAGE ON THE DISPLAY IS DIFFERENT FROM THE PRINT RESULT". The comment displayed in the comment display field 502 is not limited to this, but it is desirable to display information which can be used as criterion of judgment for selection.

The PDF interpreting section 132 may decide how to conduct the PDF interpretation, without accepting an instruction from the user. For example, there may be a setting to select "CONVERSION IN THE OS", if the PDF includes a command that may cause a print result different from the image on the display device 21. Alternatively, considering a processing load on the print system, processing powers of the computer 10 and the printer 30, and the like, in each of the cases being converted into page description language and being converted into intermediate language, either one of the options "CONVERSION INTO PAGE DESCRIPTION LANGUAGE" and "CONVERSION INTO INTERMEDIATE LANGUAGE" may be selected. As a matter of course, the criteria of judgment regarding how the PDF interpretation is carried out is not limited to above example.

When the application section 120 accepts a print command from the user, the application section 120 outputs to the OS section 110 the PDF data regarding the document being processed (S101).

Subsequently, the printer driver section 130 obtains the PDF data from the OS section 110 (S102). At this stage, the OS section 110 does not convert the PDF data. In other words, the printer driver section 130 receives the PDF data having been outputted from the application section 120, basically as it is.

The PDF interpreting section 132 of the printer driver section 130 carries out the following processing with regard to the PDF data obtained from the OS section 110, in response to the instruction from the user (S103), which the user interface section 131 has accepted in the PDF conversion process setting screen 500 and the like.

In other words, when the "CONVERSION INTO PAGE DESCRIPTION LANGUAGE" is selected, the page description language converting section 132a converts the PDF into the page description language, and outputs the language to the printer 30 (S104). Concretely, the PDF data is decompressed by a predetermined algorithm, and according to a predefined rule, the PDF command is converted into the page description language.

At this stage, the image processing section 133 is capable of performing an image processing being predetermined or on the basis of an instruction from the user. Since the PDF interpreting section 132 analyzes the PDF data, thereby recognizing objects constituting the document, the above image processing can be carried out in the units of object. Therefore, it is possible to conduct various image processing respectively optimum to the objects such as graphics and text within the same page.

In addition, since the printer driver section 130 is now capable of handling the document described in PDF in the units of object, if the printer 30 is not provided with font data designated as attribute of the text, it is possible to replace the font by the font initially held in the printer 30.

Here, since the page description language outputted to the printer 30 from the printer driver section 130 is generally smaller in size than the bitmap data having been converted, the communication load can be reduced.

The printer 30 which has received the page description language utilizes the page description language interpreting section 320 to convert the page description language into an intermediate language, and then transmits the intermediate language to the print control section 310 (S109). Subsequently, the print control section 310 generates print image data on the basis of the intermediate language, and makes the print executing section 330 perform printing (s110).

When "CONVERSION INTO INTERMEDIATE LANGUAGE" is selected, the intermediate language converting section 132b converts PDF into an intermediate language, and outputs the intermediate language to the printer 30 (S105). Concretely, PDF is decompressed by a predetermined algorithm, and according to rules defined in advance, the intermediate language converting section 132b converts the PDF command into the intermediate language.

At this stage, similarly to the conversion process of the page description language, the image processing section 133 is capable of performing a predetermined image processing or an image processing on the basis of a user's instruction. In addition, the image processing section 133 is also capable of replacing fonts.

Here, since the intermediate language outputted to the printer 30 from the printer driver section 130 is generally smaller in size than the bitmap data having been converted, the communication load can be reduced also in this case.

The printer 30 which has received the intermediate language utilizes the print control section 310 to generate print image data on the basis of the intermediate language, and makes the print executing section 330 perform printing (S110).

When "CONVERSION IN THE OS" is selected, the image data processing section 132c requests the PDF converting section 111 in the OS section 110 to convert PDF into bitmap data (S106). Then, when the PDF converting section 111 converts PDF into bitmap data, the image data processing section 132c obtains the bitmap data thus converted from the PDF converting section 111 (S107).

The image data processing section 132c converts the bitmap data into an intermediate language and outputs the intermediate language to the printer 30 (S108). With such conversion, the bitmap data is converted into the intermediate language in form to allow interpretation by the printer 30. Here, it is also possible that the bitmap data is converted in form into a page description language and outputted to the printer 30.

As thus described, when the option "CONVERSION IN THE OS" is selected, the PDF converting section 111 provided in the OS section 110 is used to convert PDF into bitmap data. Therefore, it is possible to obtain a print result as exactly shown on the display device 21, even when a print result is different from the image on the display device 21 in the case where "CONVERSION INTO PAGE DESCRIPTION LANGUAGE" or "CONVERSION INTO INTERMEDIATE LANGUAGE" has been selected.

In the embodiment as described above, PDF has been taken as an example of a standard display format, which is employed by the operating system, but the present invention is not limited to this example. For instance, when PostScript (PS) developed by Adobe Systems, Inc. is utilized, the present invention can be effectively applied. PostScript is a standard page description language, but it may also be used as a format to be outputted from the OS section 110 to the printer driver section 130.

In such a case, if the page description language which can be interpreted by the printer 30 is other than PostScript, that is, if the printer 30 is incapable to interpret PostScript, the present invention is particularly effective.

There are some ways of print processing method for this case.

The first method is implemented by replacing PDF with PostScript in the configuration and processing flow shown in FIG. 2. In other words, with reference to FIG. 2, the PDF interpreting section 132 of the printer driver section 130 is configured as a PS interpreting section, with a function to convert PostScript into a page description language or an intermediate language is made.

However, in this method, it is necessary to develop the PDF interpreting section 132 and the PS interpreting section independently, so as to allow the printer driver section 130 to interpret both PDF and PostScript, or to provide printer driver sections 130 respectively suitable for PDF and PostScript. Therefore, it may cause a significant cost increase and the like.

Figure 4:
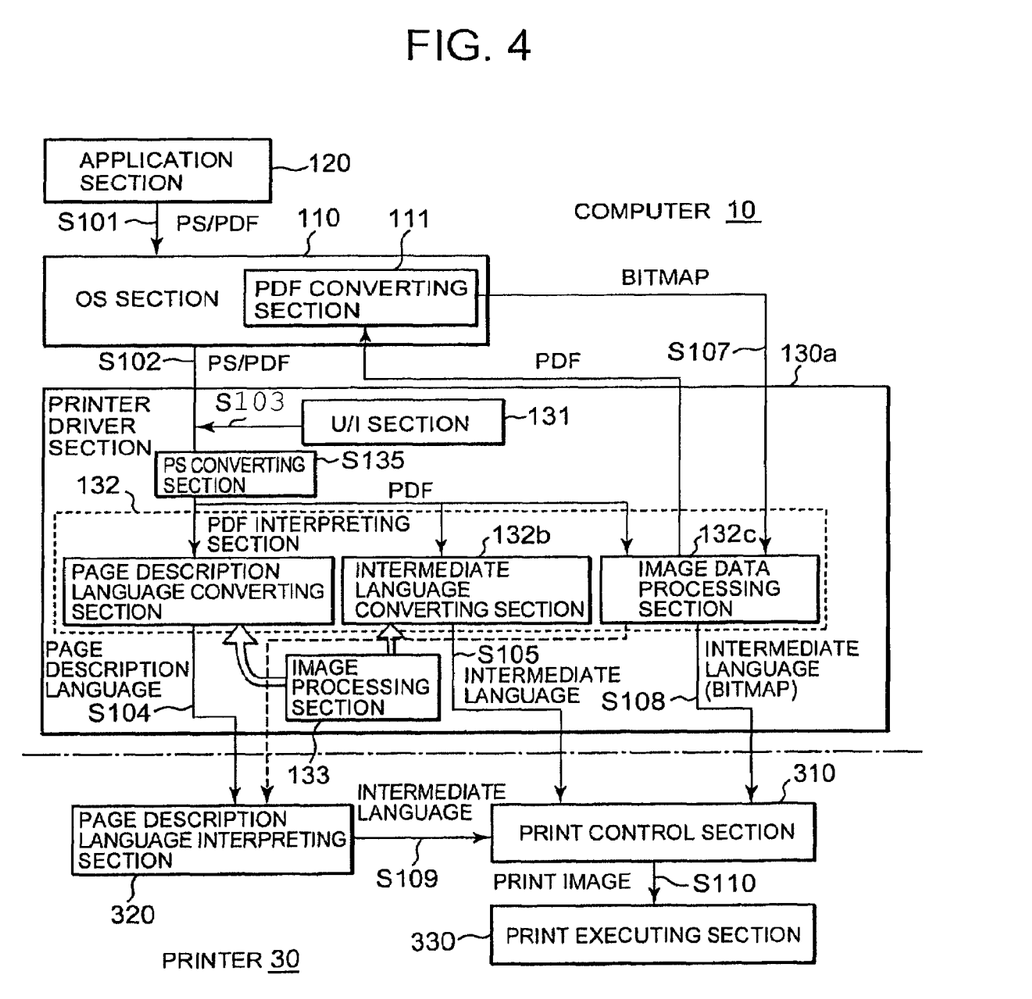
FIG. 4 is a block diagram to explain another example of functional configuration of the print system.

In view of this situation, as shown in FIG. 4, printer driver section 130a provided with PS converting section 135 to convert PostScript into PDF is employed. With this configuration, it is possible to handle any of PostScript and PDF, just by modifying the aforementioned printer driver section 130 to some extent.

It is assumed here that if document data is transmitted from the OS section 110 in PostScript format, the PS converting section 135 converts the data into PDF and outputs thus converted data. On the other hand, if the document data is transmitted from the OS section in PDF, the PS converting section 135 outputs the data in PDF as it is. The other functional parts of the printer driver section 130a may be the same as those of the aforementioned printer driver section 130.

What is claimed is:

1. A print control method in a computer including an operating system which executes a conversion process to convert data in electronic document format into data in bitmap format, comprising:
   accepting print target data in electronic document format from said operating system;
   a first outputting operation which generates, based on said print target data in electronic document format, print data in a command language format configured for interpretation by a printer as a control target and outputs the print data thus generated to said printer;
   a second outputting operation which requests said operating system to convert said print target data in electronic document format into bitmap format data, and outputs print data based on said bitmap format data thus converted to said printer; and
   a selecting operation which selects one of said first outputting operation and said second outputting operation.

2. The print control method in a computer according to claim 1, wherein,
   said printer is configured to interpret multiple command language formats, and
   said first outputting operation selectively generates print data in any of the multiple command language formats.

3. The print control method in a computer according to claim 2, wherein, said multiple command language formats which said printer is configured to interpret include a first command language format which is directly interpreted, and a second command language format which is firstly converted into the first command language format and then interpreted.

4. The print control method in a computer according to any one of claim 2 and claim 3, wherein,
a selection of:
   a) the first outputting operation and the second outputting operation; and
   b) command language format when the first outputting operation is selected; is based on instruction from a user.

5. The print control method in a computer according to claim 1, wherein a selection of said first outputting operation and said second outputting operation is based on the print target data.

6. The print control method in a computer according to claim 1, wherein,
said electronic document format is to represent the print target data in units of object, and an image processing is conducted in said first outputting operation in units of object constituting said print target data in electronic document format.

7. The print control method in a computer according to claim 1, wherein,
said electronic document format is PDF (Portable Document Format).

8. The print control method in a computer according to claim 1, further comprising:
   an operation for accepting from said operating system, print target data in a page description language which said printer is incapable of interpreting, and
   an operation for converting said print target data into data in electronic document format, when said print target data in the page description language is accepted.

9. The print control method in a computer according to claim 8, wherein said page description language is PostScript.

10. A computer readable storage medium storing printer driver program, which operates on an operating system making a computer execute a conversion processing to convert data in electronic document format into data in bitmap format, wherein said printer driver program causes the computer execute operations comprising:
   an accepting process which accepts from said operating system print target data in electronic document format;
   a first outputting process which generates, based on said print target data in electronic document format, print data in a command language format configured for interpretation by a printer as a control target, and outputs the print data thus generated to said printer;
   a second outputting process which requests said operating system to convert said print target data in electronic document format into bitmap data, and outputs print data based on the bitmap data thus converted to said printer; and
   a selecting process which selects one of said first outputting process and said second outputting process.

* * * * *